US012748700B2

(12) United States Patent
Singh

(10) Patent No.: US 12,748,700 B2
(45) Date of Patent: Sep. 29, 2026

(54) APPLICATION ACCELERATION WITH DYNAMIC CONTENT CACHING

(71) Applicant: Palo Alto Networks, Inc., Santa Clara, CA (US)

(72) Inventor: Mritiyunjay Kumar Singh, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 12 days.

(21) Appl. No.: 19/000,989

(22) Filed: Dec. 24, 2024

(65) Prior Publication Data

US 2026/0178492 A1 Jun. 25, 2026

(51) Int. Cl.
*G06F 12/0802* (2016.01)
*H04L 67/02* (2022.01)

(52) U.S. Cl.
CPC .......... *G06F 12/0802* (2013.01); *H04L 67/02* (2013.01)

(58) Field of Classification Search
CPC ..... H04L 67/568; H04L 69/329; H04L 67/51; H04L 67/104; H04L 41/0813; H04L 41/0823; H04L 41/0869; H04L 41/12; H04L 41/50; H04L 41/509; H04L 43/04; H04L 43/10; H04L 67/5682; H04L 67/60; H04L 43/08; H04L 47/83; H04L 67/10; H04L 41/0816; H04L 61/4511; H04L 65/60; H04L 41/5041; H04L 61/10; H04L 61/2503; H04L 61/4535; H04L 61/58; H04L 65/403; H04L 67/06; H04L 67/1078; H04L 67/2885; H04L 67/289; H04L 67/55; H04L 69/03; H04L 67/34; H04L 67/1046; H04L 67/107; H04L 63/0428;

(Continued)

(56) References Cited

U.S. PATENT DOCUMENTS 10,218,810 B2 2/2019 Kuperman et al.
2008/0120281 A1 * 5/2008 Marceau .............. G06F 16/972

(Continued)

OTHER PUBLICATIONS

Wu, et al., "A Comprehensive Review on Edge Caching from the Perspective of Total Process: Placement, Policy and Delivery", Sensors 2021, 21, 5033, Jul. 24, 2021, 28 pages.

(Continued)

*Primary Examiner* — Djenane M Bayard
(74) *Attorney, Agent, or Firm* — Gilliam IP PLLC

(57) ABSTRACT

Historical HTTP transactions are analyzed to determine whether dynamic content can be cached. The analysis yields statistics and key templates of APIs represented in the HTTP transactions. To generate the key templates and statistics, API requests are organized by common request method, domain and path and then by common response content. The common request method, domain and path are used as an API fingerprint. Each set of API requests resulting from the organizing is analyzed to identify variable components and common components among the API requests in the set. The variable components in each set of API requests are incorporated into a key template and statistics are determined through analysis of the API requests. If the statistics satisfy a dynamic content caching criterion, then a cache key is created based on the key template and provided along with the common response content for updating a cache of an edge server.

21 Claims, 7 Drawing Sheets

(58) Field of Classification Search
CPC . H04L 67/1093; H04L 63/08; H04L 63/0823; G06F 15/173; G06F 15/177; G06F 9/5055; G06F 9/5083; G06F 16/955; G06F 16/9574; G06F 8/71; G06F 9/547; G06F 16/972; G06F 8/313; G06F 9/544; G06F 16/2379; G06F 16/24552; G06F 16/25; G06F 16/9532
See application file for complete search history.

(56) References Cited

U.S. PATENT DOCUMENTS

| | | | | |
|---|---|---|---|---|
| 2015/0207897 | A1* | 7/2015 | Flack | G06F 16/00<br>709/213 |
| 2017/0366637 | A1* | 12/2017 | Bandyopadhyay | H04L 67/568 |
| 2021/0092199 | A1* | 3/2021 | Buehler | H04L 67/5682 |

OTHER PUBLICATIONS

Zhou, et al., "Caching in Dynamic Environments: A Near-Optimal Online Learning Approach", IEEE Transactions on Multimedia, vol. 25, Dec. 2, 2021, pp. 792-804.

* cited by examiner

APPLICATION ACCELERATION WITH DYNAMIC CONTENT CACHING

BACKGROUND

The disclosure generally relates to building a cache of dynamic content (e.g., CPC class H04L67/568).

A content delivery network (CDNs) is a network of geographically distributed edge servers and origin servers. Content (e.g., video, files, music, images, etc.) is replicated from origin servers that originate content to edge servers that are physically closer to consumers of the content. Content is cached at the edge servers to reduce latency in responding to requests for content with physical proximity. The content provided from a CDN can typically be static content or dynamic content. Static content does not change across requests or changes infrequently. Dynamic content is content that can vary across transactions based on user, location, time, etc. Due to its varying nature, dynamic content cannot be as easily cached as static content. Conventional dynamic content caching strategies include strategies such as user-specific caching, and device-based caching. User-specific caching incorporates user-specific tokens (e.g., sessionIDs or access tokens) into cache keys. Device-based caching adds contextual information like device type or geolocation to the cache keys. Device-driven caching can specify device information such as device type, operating system or browser as part of the cache key as well.

BRIEF DESCRIPTION OF THE DRAWINGS

Embodiments of the disclosure may be better understood by referencing the accompanying drawings.

DESCRIPTION

Figure 1:
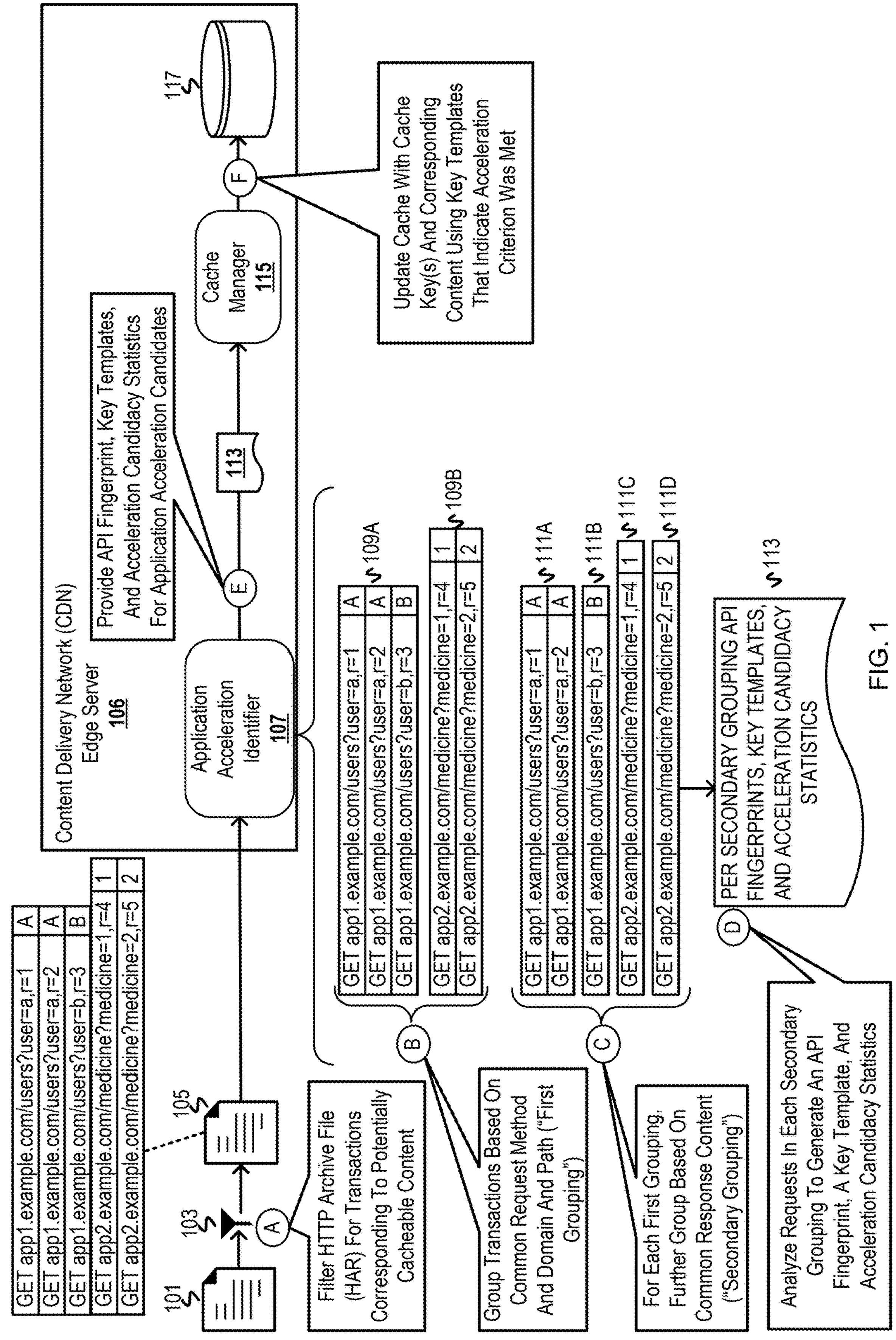
FIG. 1 is a diagram of a content delivery network (CDN) edge server analyzing HTTP transactions to create key templates and statistics for dynamic content caching.

The description that follows includes example systems, methods, techniques, and program flows to aid in understanding the disclosure and not to limit claim scope. Well-known instruction instances, protocols, structures, and techniques have not been shown in detail for conciseness.

Terminology

This description refers to "accelerating APIs." This phrase is a shorthand description for increasing the efficiency (i.e., accelerating response time) in responding to application programming interface (API) requests of a web-based application. While API requests are sometimes referred interchangeably in informal settings, an HTTP (HyperText Transfer Protocol) request and an API request have a subtle difference in meaning. An HTTP request is a request message that conforms to HTTP. An API request is a request that conforms to an API of an application. The disclosed technology is identifying opportunities to accelerate APIs of web-based applications that define how requests are to be communicated, which in these cases involves sending HTTP requests. Thus, HTTP requests can be considered a superset of API requests for this disclosure.

The term "component indicator" is an indicator of a component that can be used for extracting or locating the component in an API request or API response. If a component indicator indicates a component itself, then a parser can be used to locate and extract the component. If the component indicator is a function, then the function can be run to locate and extract the component. For example, an indicator: "request.queryString.r" can be run/invoked to locate the "r" component within the "queryString" component of a uniform resource locator (URL) or an API request.

The description uses the term "API fingerprint" to refer to the request method, domain and path components of an API request URL. For example, if a request HTTP method was GET and the HTTP request line included the URL "app1.example.com/users?user=A,location=us", then the API fingerprint would consist of the request method "GET" and the domain and path components of the URL "app1.example.com/users".

The description uses the term "key template" to refer to a data structure that can hold component indicators associated with an API fingerprint and that is used to generate a cache key for updating a cache with dynamic content or a cache lookup key to search a cache. A variable component indicator is a component indicator that refers to a component of a request, not solely the URL of the request but also components of the request header and body, that varies among requests.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

An Application Programming Interface (API) fingerprinting technique has been created that facilitates dynamic content caching. The technique analyzes historical HTTP transactions of dynamic content that can be cached to generate statistics and key templates of APIs represented in the HTTP transactions and determines caching candidacy based on analysis of the statistics. To generate the key templates and statistics, API requests are organized by common request method and domain and path and then by common response content. The common request method and domain and path are used as an API fingerprint. Each set of API requests resulting from the organizing is analyzed to identify variable components and common components among the API requests in the set. The variable components in each set of API requests are incorporated into a key template and statistics are determined through analysis of the API requests. If the statistics satisfy a dynamic content caching criterion, then a cache key is created based on the key template and provided along with the common response content for updating a cache of an edge server. When determining whether a cached response content can be provided for responding to an API request, the edge server uses the API fingerprint of an API request to identify a matching key template and applies the key template to the API request to generate a cache lookup key for accessing the cache.

Example Illustrations

FIG. 1 is a diagram of a content delivery network (CDN) edge server analyzing HTTP transactions to create key templates and statistics for dynamic content caching. FIG. 1 depicts a CDN edge server 106 that includes an application acceleration identifier 107 that identifies opportunities for application acceleration with dynamic content caching, a cache manager 115, and a cache 117 managed by the cache manager 115. FIG. 1 depicts an HTTP archive (HAR) file 101 which is a log of HTTP transactions. A HAR file can be obtained through an HTTP proxy, or through browser development tools. FIG. 1 depicts a filter 103 which filters out transactions which do not fulfill criterion to be considered for dynamic content caching, which generates a filtered HAR file 105. In this example, the filter 103 is shown as an external process to the edge server 106, but in some cases the filtering can be performed internally by the edge server 106. FIG. 1 depicts the filtered HAR file 105 being sent to the application acceleration identifier 107 of the edge server 106.

FIG. 1 is annotated with a series of letters A-F representing stages of one or more operations. Although these stages are ordered for this example, the stages illustrate one example to aid in understanding this disclosure and should not be used to limit the claims. Subject matter falling within the scope of the claims can vary from what is illustrated.

At stage A, the filter 103 filters the HAR file 101 for transactions corresponding to potentially cacheable dynamic content. The filter 103 filters the transactions based on defined criteria for transactions corresponding to cacheable dynamic content. Examples of these criteria include content validity criteria (e.g., uncorrupted or complete data), valid status codes (e.g., HTTP response codes 200-300 range), and minimum response time corresponding to an application that would benefit from acceleration. As depicted in FIG. 1, the filtered HAR file 105 includes five entries, represented here by their request Uniform Resource Locator (URL) and response content for the sake of simplicity. In practice, each transaction will include message headers and bodies. The API requests in the five entries in the filtered HAR file 105 are:

1. GET app1.example.com/users?user=a,r=1
2. GET app1.example.com/users?user-a,r=2
3. GET app1.example.com/users?user-b,r-3
4. GET app2.example.com/medicine?medicine=1,r=4
5. GET app2.example.com/medicine?medicine=2,r=5

At stage B, the application acceleration identifier 107, upon receiving the filtered HAR file 105, groups transactions based on common API fingerprint (i.e., common request method and domain and path), creating a first set/grouping of transactions. FIG. 1 depicts two groups 109A and 109B of the first grouping. The first group 109A comprises API requests with the common API fingerprint "GET app.example.com/users", sharing the common request method "GET", the common domain "app.example.com" and the common URL path "users". Similarly, the second group of transactions 109B share the common request method "GET", the common domain "app2.example.com" and the common path "medicine".

At stage C, the application acceleration identifier 107 further groups transactions within each first grouping based on their common response content, creating a second or secondary grouping of transactions which includes groups 111A-111D. Response content includes the header and body of the response message. The group 109A is divided into two groups 111A and 111B, where the group 111A has the common response content "A", and the group 111B has the common response content "B". Similarly, the second group 109B of the first grouping is divided into groups 111C, 111D. As each member of group 109B had unique response content, the groups 111C and 111D each comprises a single member having the response content "1" and "2" respectively.

At stage D, the application acceleration identifier 107 analyzes API requests in each secondary grouping to generate an API fingerprint, a key template, and acceleration candidacy statistics (previously mentioned just as "statistics"). For each secondary grouping, the application acceleration identifier 107 performs pairwise comparisons of constituent API requests to identify API request components that are common across the grouping and that vary across the grouping. While performing the comparisons, the application acceleration identifier 107 maintains statistics of commonalities and variations for each secondary grouping. For each secondary grouping, the application acceleration identifier 107 derives the API fingerprint from the request URL of the secondary grouping. The application acceleration identifier 107 generates the key template based on the maintained variation statistics. Maintaining the statistics of commonality and variations involves updating the statistics based on each pairwise comparison. After completion of the comparisons, the maintained statistics are used as the acceleration candidacy statistics. Thus, the application acceleration identifier 107 analysis yields, for each secondary grouping, an API fingerprint, a key template, and acceleration candidacy statistics. For convenience, the aggregate of this information will be identified in FIG. 1 as data 113.

At stage E, the application acceleration identifier 107 provides the data 113 to the cache manager 115 for application acceleration candidate determination. The cache manager 115, for each API fingerprint, evaluates the acceleration candidacy statistics in the data 113 for that API fingerprint to determine whether the API identifiable by the API fingerprint in the data 113 is a candidate for acceleration. The criterion for acceleration is configurable and likely is based on consistency and efficiency. The example being illustrated in FIG. 1 is for a "full match" type of acceleration. A full match refers to all requests corresponding to an API fingerprint having the same response content. Thus, the acceleration criterion can be that the response content match be 100% for the API fingerprint. For example, given the secondary grouping 111A, with members:

"app1.example.com/users?user-a,r=1" and

"app1.example.com/users?user=a,r=2", all members of the grouping corresponding to the API fingerprint "GET app1.example.com/users" map to the same response content "A." The data 113 will include a record or data structure for each API fingerprint that includes the content match statistics and will be used to update the cache 117 if the response content match statistics is 100%.

At stage F, the cache manager 115 updates the cache 117 with cache key(s) and corresponding dynamic content for each API fingerprint that satisfies the acceleration criterion. For each API fingerprint representing an API to be accelerated, the cache manager 115 selects a representative request from the secondary grouping of API requests and uses the key template to create a cache key. To create the cache key using the key template, the cache manager 115 extracts the variable components indicated in the key template from the representative API request to generate the cache key. The cache manager 115 then updates the cache 117 with the generated cache key and the corresponding dynamic content.

Figure 2:
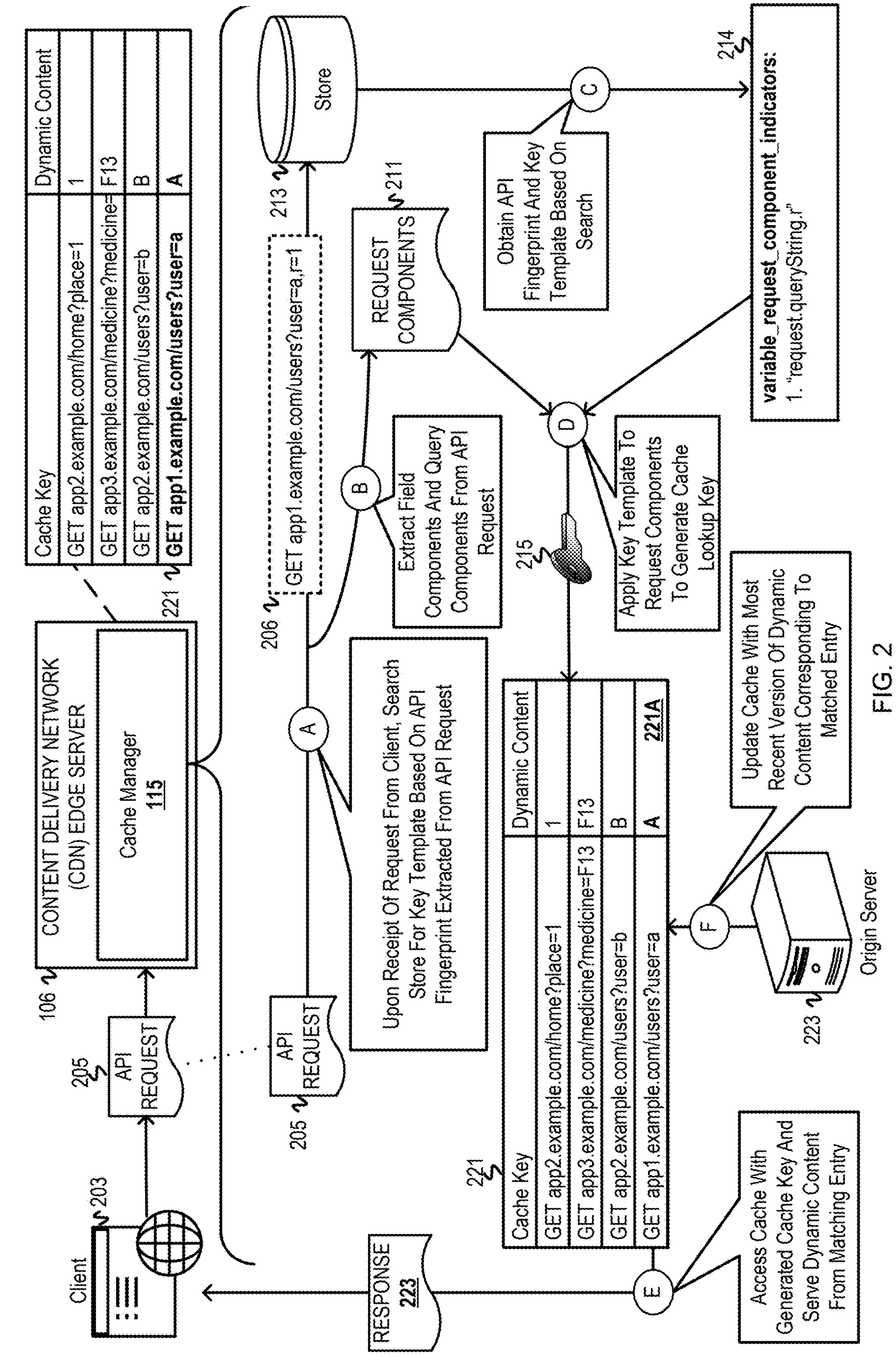
FIG. 2 is a diagram of the CDN edge server 106 leveraging API fingerprinting and cache key templates to determine if the cached dynamic content can be served in response to an API request.

FIG. 2 is a diagram of the CDN edge server 106 leveraging API fingerprinting and cache key templates to determine if the cached dynamic content can be served in response to an API request. The description references two types of components belonging to an API request, being a "field component" and a "query component." A field component in this context is a component of the API request header or body which is a "leaf" component of the request, assuming the request is represented as structured data such as a JavaScript Object Notation (JSON) tree. A query component is a URL component of a request URL. FIG. 2 depicts a segment 221 of the cache 117 and presumes the cache 117 has been updated with dynamic content for APIs. In FIG. 2, a client 203 sends an API request 205 to the edge server 106. The API request 205 is shown in FIG. 2 as including a URL: "GET app1.example.com/users?user=a, r=1". The cache segment 221 is depicted within the edge server 106 with entries including cache keys and their corresponding dynamic content. FIG. 2 depicts the cache segment 221 as:

| Cache Key: | Dynamic Content |
|---|---|
| GET app2.example.com/home?place = 1 | 1 |
| GET app3.example.com/medicine?medicine = F13 | F13 |
| GET app2.example.com/users?user = b | B |
| GET app1.example.com/users?user = a | A |

The cache segment 221 comprises four cache keys corresponding to four API fingerprints: "GET app2.example.com/home",
"GET app2.example.com/users",
"GET app3.example.com/medicine",
and
"GET app1.example.com/users" which matches the API fingerprint of the incoming API request 205.

FIG. 2 depicts the edge server 106 querying a store 213 to determine if the store 213 has a key template with an API fingerprint corresponding to a URL 206 of the API request 205.

FIG. 2 is annotated with a series of letters A-F representing stages of one or more operations. Although these stages are ordered for this example, the stages illustrate one example to aid in understanding this disclosure and should not be used to limit the claims. Subject matter falling within the scope of the claims can vary from what is illustrated.

At stage A, the cache manager 115, upon receipt of the API request 205 from the client 203, searches the store 213 for an API fingerprint corresponding to the API request 205. The cache manager 115 extracts from a URL 206 of the API request 205 the request method component, the domain component and the path component. For this illustration, the store 213 hosts key templates for multiple APIs. The cache manager 115 searches the store 213 to determine whether the store includes an API fingerprint matching the extracted request method and domain and path components. In FIG. 1, the cache manager 115 determines that the store 213 includes a matching API fingerprint and that the API has been accelerated with caching of dynamic content. Since the API has been accelerated, the cache manager 115 proceeds with determining whether the edge server 106 can respond to the API request 205 based on cached dynamic content.

At stage B, the cache manager 115 extracts request components 211 from the API request 205. The request components 211 include components from the body and the header of the API request 205. A request component is a key or field name and its assigned value. Referring to the URL 206 which occurs in the header of the API request 206, "GET app1.example.com/user?user=a,r=1" has two request components: "user=a" and "r=1".

At stage C, the cache manager 115, which can occur concurrently or prior to stage B, obtains a key template 214 from the store 213 based on querying the store in stage A. In this example, the key template 214 is depicted as:

variable_request_component_indicators:

1. "request.queryString.r".

Although a key template will likely include multiple variable request component indicators, the key template 214 only depicts one for simplicity of explanation.

At stage D, the cache manager 115 applies the key template 214 to the request components 211 to generate a cache lookup key 215. To apply the key template, the cache manager 115 searches the request components 211 for each variable request component indicator in the key template 214 and removes a component if found in the request components 211. The remaining components in the request components 211 are used to generate the cache lookup key 215. To provide an illustrative example, the request components 211 includes the request components "user=a", and "r=1". The key template 214 specifies that the request component "r=1" is a variable request component. Thus, the cache manager 115 searches for this component and then removes "r=1". After removal of r=1, the cache manager 115 creates the cache lookup key 215 with the API fingerprint and the remaining request components which yields the resulting cache lookup key "GET app1.example.com/users?user=a". Applying a key template to generate a cache key or cache lookup key can be different across embodiments. For example, the cache manager 115 can parse the API request 205 to generate a structured representation of the API request with extracted key value pairs. The cache manager 115 can then apply a key template by invoking locator functions specified in a key template. The locator functions can be defined to search for a string and remove the string from the target, which in this case is the structured representation of the API request 105. The remaining components in the structured representation would collectively be the cache lookup key.

At stage E, the cache manager 115 accesses the cache 221 with the cache lookup key 215 and serves a dynamic content 221A from the matching entry. The entry that includes the dynamic content 221A is bolded to depict that it was a match for the cache lookup key 215. FIG. 2 depicts the edge server 106 communicating a response 223 to the client 203. The response 223 includes the dynamic content 221A.

At stage F, the cache manager 115 updates the content at the matching entry of the cache segment 221. After (or concurrent with) serving cached dynamic content in response to a request, the cache manager 115 submits the API request to an origin server to maintain recency of the cached content.

Figure 3:
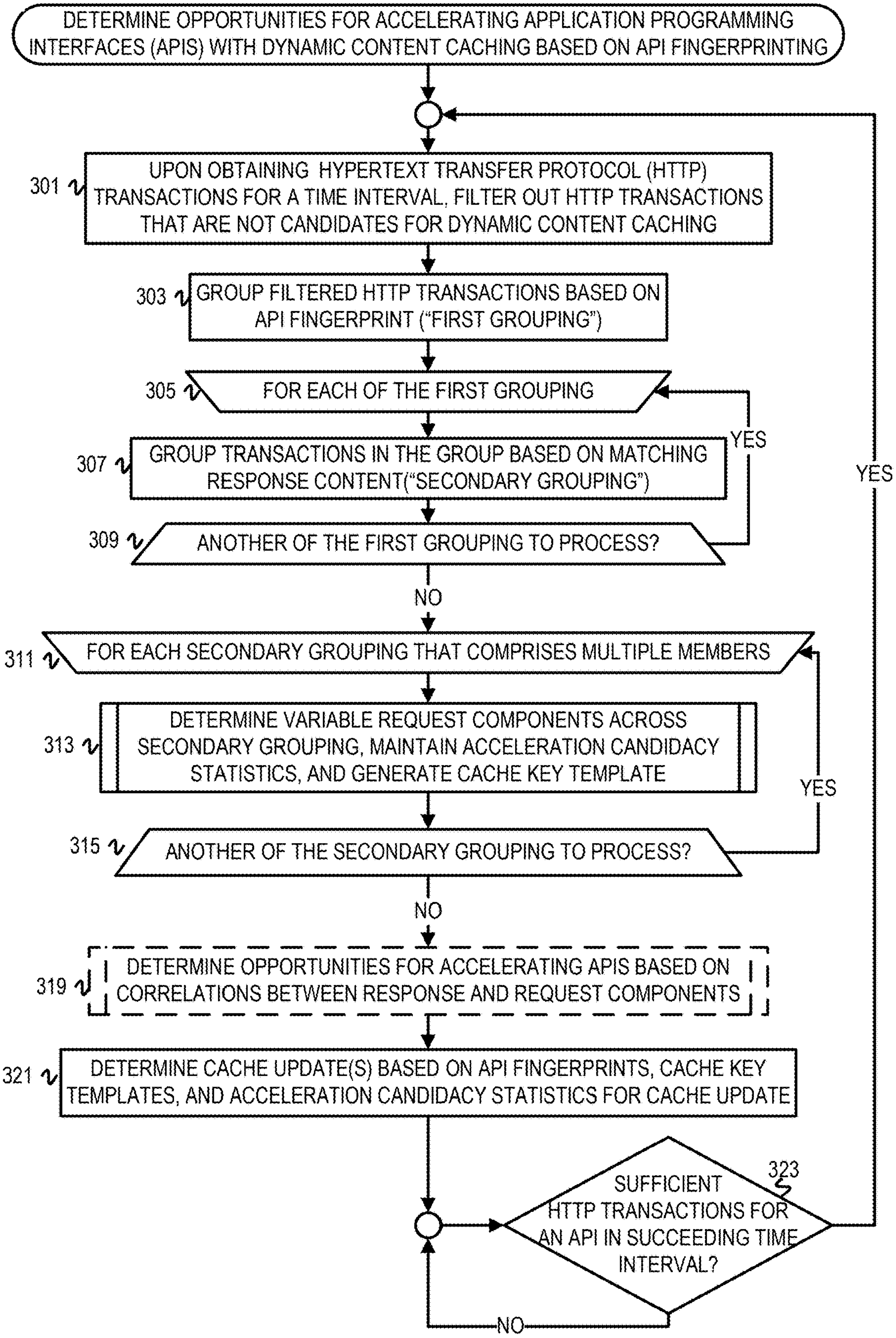
FIG. 3 is a flowchart of example operations for determining opportunities for accelerating APIs with dynamic content caching based on API fingerprinting.
Figure 4:
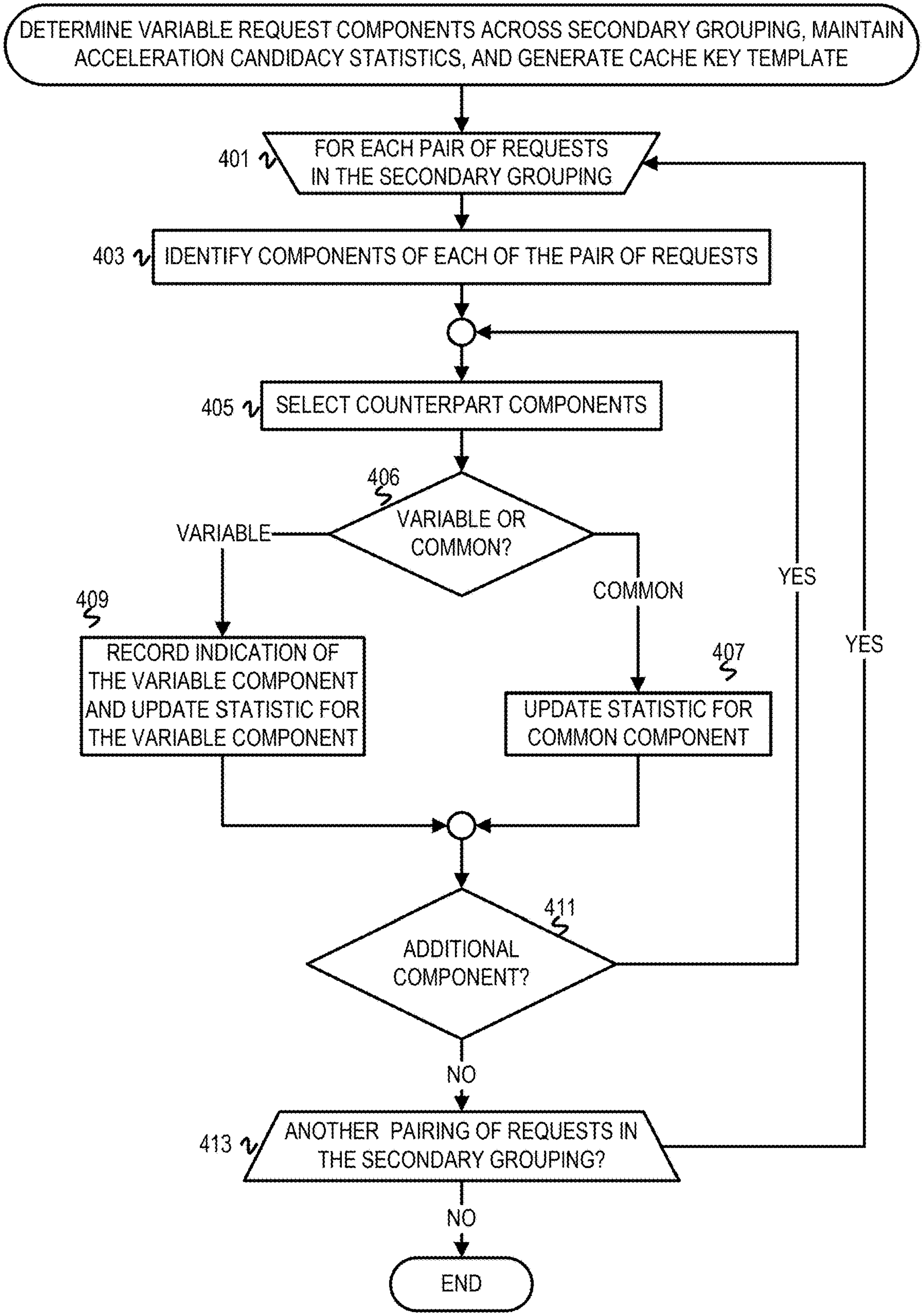
FIG. 4 is a flowchart of example operations for determining variable request components across a secondary grouping, maintaining acceleration candidacy statistics, and generating a key template.
Figure 5:
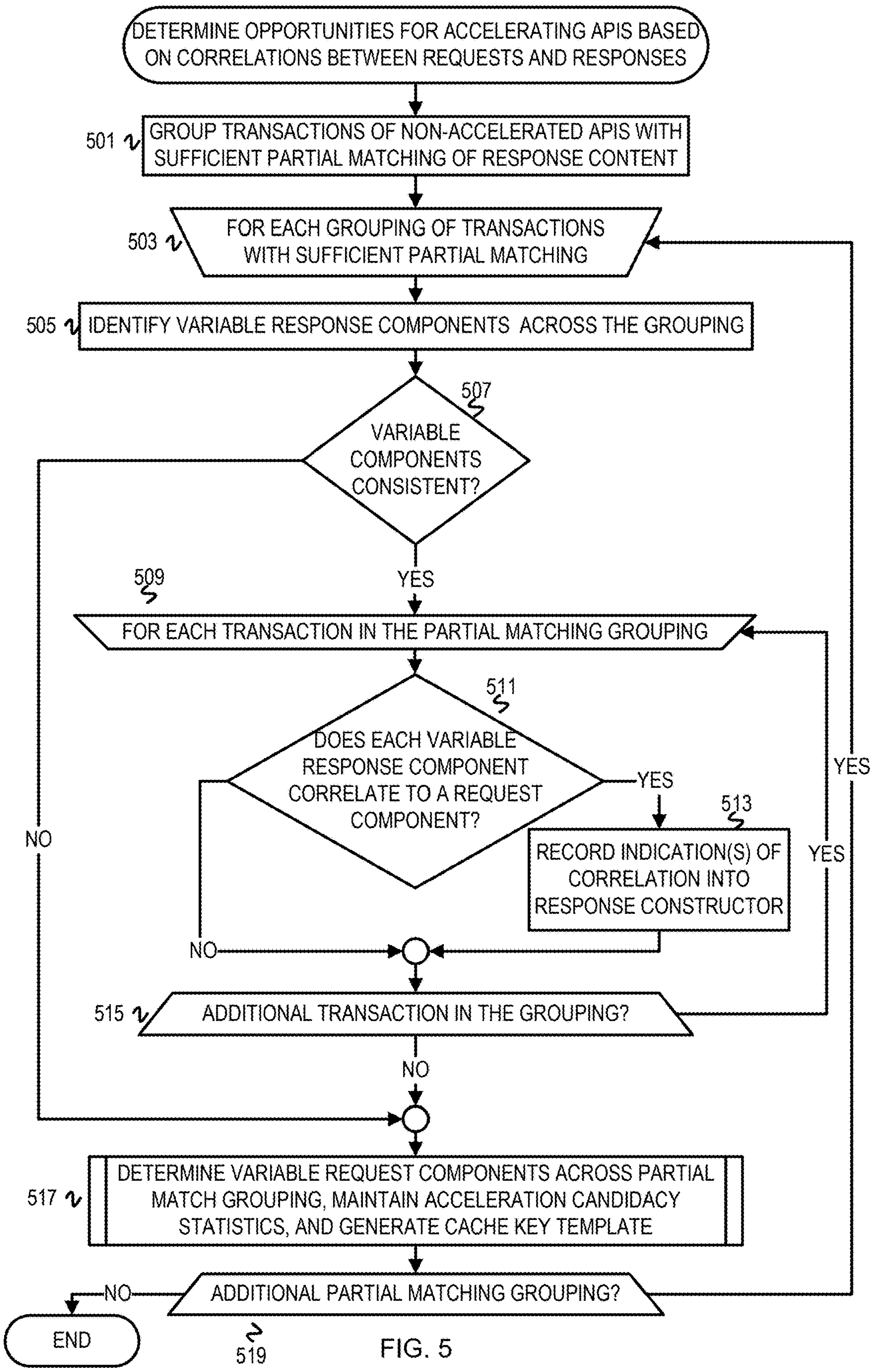
FIG. 5 is a flowchart of example operations for determining opportunities for accelerating APIs based on correlations between requests and responses.

FIGS. 3-5 are flowcharts of example operations related to caching dynamic content based on API fingerprints and use of the dynamic content cache. FIGS. 1-2 presented examples of caching dynamic content that was common across different requests of an API. However, an API with some variation across responses can still be cached, which is sometimes referred to herein as partial matching as the responses across API requests partially match. This partial matching technique relies on correlating the varying components of a response to request components to allow dynamic content to be served in response to an API request based on API request components. FIGS. 3-4 correspond to full matching while FIG. 5 corresponds to partial matching. The example operations are described with reference to the "cache manager" for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for determining opportunities for accelerating APIs with dynamic content caching based on API fingerprinting. While the flowchart is directed primarily to accelerating an API based on full matching, the flowchart includes a block 319 for determination of partial matching based opportunities for API acceleration. This block 319 is indicated in a dashed line to convey that it is not necessary for an embodiment to consider partial matching based acceleration.

At block 301, the cache manager, upon obtaining HTTP transactions for a time interval (e.g., an hour), filters out HTTP transactions that are not candidates for dynamic content caching. The HTTP transactions can be indicated in a log or archive of HTTP transactions. A single transaction typically includes an HTTP request and response, but the transactions may include HTTP requests without counterpart responses. The determination of which transactions are candidates for dynamic content caching is based on configurable criteria. Example criteria include a criterion that content of a response be dynamic content and not static content, a criterion that the response content contain valid data (i.e., the entries do not contain missing or invalid/corrupted information), a criterion that a transaction have both a request and a response, a criterion that the transaction corresponds to an API transaction (i.e., an API request and a response to the API request), and a criterion that a response to an API request indicates a response code that is in a range of valid response codes (i.e., in the 200-300 range of response codes). In addition to criteria based on the requests and responses themselves, a criterion can be based on metadata of transactions, such as performance measurements. For example, a criterion can be that a transaction be filtered out if the response time is below a specified threshold (i.e., the response time is sufficiently fast that acceleration will not yield a noticeable improvement).

At block 303, the cache manager groups the filtered HTTP transactions based on a first feature that is an API fingerprint (e.g., a common request method, common domain and common path). The cache manager parses the request line of the API requests in the HTTP transactions to determine an API fingerprint for each API request. The cache manager can then group the transactions by API fingerprint, for example, by organizing into a data structure according to the grouping or tagging the transactions with the API fingerprints. For example, if a transaction has the request URL "GET app1.example.com/users?user=a,location=us,r=1", the transaction would be placed into a group corresponding to the API fingerprint "GET app1.example.com/users" which has the request method "GET", domain "app1.example.com" and the path "/users". Each group is referred to as a "first grouping." Inclusion of the URL delimiters (e.g., "/" or "?") in the API fingerprint depends upon implementation choice.

At block 305, the cache manager begins to process each group of the first grouping. For each first group, operations continue at block 309.

At block 307, the cache manager groups transactions in the first group based on matching response content (second feature) which creates secondary groupings. Determining commonality between response content (i.e., matching payloads of responses) can be with literal comparison or compact representative comparison (e.g., with hash values). For example, the cache manager can compute hash values for the response content corresponding to each of the members of the first grouping. Then the cache manager can group the members of the first grouping by hash mappings (i.e., the members that map to the same hash value would be in a secondary grouping).

At block 309, the cache manager determines if there is another group of the first grouping to process. If there is another first grouping to be processed, operations continue at block 305. Otherwise, operations continue at block 311.

At block 311, the cache manager starts processing each group in the secondary grouping that comprises multiple members. If a secondary grouping only has a single member, then it is not a candidate for full matching based acceleration.

At block 313, the cache manager determines variable request components across transactions of the secondary grouping, generates a cache key template, and maintains acceleration candidacy statistics. The cache manager creates the key template based on the variable request component indicators determined from analyzing the members of the secondary grouping. While analyzing the members of the secondary grouping, the cache manager maintains acceleration candidacy statistics that will be used to determine whether to accelerate an API. This operation is further described in FIG. 4.

At block 315, the cache manager determines if another secondary grouping needs to be processed. If there is another secondary grouping to be processed, operations continue at block 311. Otherwise, operations continue at block 319.

At block 319, the cache manager determines opportunities for accelerating APIs based on correlations between responses and requests. An API identified by an API fingerprint may still be accelerated if the variation in response content can be consistently correlated to request content to allow for a response to be constructed based on the correlated request content. This determination is further explored in FIG. 5.

At block 321, the cache manager determines cache update(s) based on the API fingerprints, cache key templates, and acceleration candidacy statistics. For each API fingerprint with transactions that satisfy full matching (i.e., multiple requests with the common request method, domain and path components that map to the same response content), the cache manager constructs a cache key based on the corresponding key template and a representative one of the API requests for the API. The cache manager selects each API fingerprint, assuming multiple APIs were detected in the HTTP transactions, and then a representative API request from the API requests that map to the API fingerprint. The cache manager then applies the key template for the API fingerprint to the representative API request. This removes components from the API request that match the variable request component indicators in the key template. To provide an illustrative example, if a representative API request associated with the key template was: "GET app1.example.com/users?user=a,r=1", and the key template matching the API fingerprint of the representative API request had the variable request component: "request.queryString.r", then through extracting the "r" component from the representative API request, the remaining request would be: "GET app1.example.com/users?user-a". In this example, the API request is shown as a string for the purpose of simplicity and only consists of query components. In practice, an API request has additional components within the body and header of the request which also are potentially extracted when creating a cache key. The resulting string can be used as a cache key, or a hash value can be computed and used as the cache key. For each cache key created, the corresponding dynamic content (i.e., response header and body) is associated therewith, and the cache is updated with the constructed cache key and the dynamic content. For example, the cache manager updates the cache with an entry that associates a cache key with a response header file and a response body file.

At block 323, the cache manager determines whether sufficient HTTP transactions for an API have been obtained in a next time interval. The cache manager can request or generate more logs or archive files of HTTP transactions observed by the cache server that will use the dynamic content cache. The transactions can be filtered and accumulated until a sufficient number of transactions for an API, as indicated by a configurable threshold, have been obtained for analysis. This ongoing analysis allows the caching of dynamic content for an API to adjust as the API adjusts. For instance, an application update can impact the requests and/or responses of the API of the application. The statistics can be maintained across intervals and analyzed to detect trends, such as decreasing full matches. Furthermore, the statistics can be used to decide whether to bypass the cache.

FIG. 4 is a flowchart of example operations for determining variable request components across a secondary grouping, maintaining acceleration candidacy statistics, and generating a key template. These operations are performed for each secondary grouping formed from the operation represented by block 307. These operations presume an implementation that analyzes API requests with pairwise comparisons.

At block 401, the cache manager begins iterating over different pairs of transactions/entries in the secondary grouping. The cache manager will compare every pair-permutation of transactions in the secondary grouping.

At block 403, the cache manager identifies components of the pair of API requests in the secondary grouping. For instance, the cache manager parses each of the API requests to identify the key-value pairs. Parsing can involve a recursive traversal of the API requests. For instance, the API requests may be hierarchically structured, such as in a JSON object as previously mentioned. With hierarchically structured API requests, the cache manager would identify variances and commonalities at each level while traversing to leaf nodes or leaf components.

At block 405, the cache manager selects counterpart components. Using key-value pairs to illustrate, the cache manager selects the same key in the pair of requests. These are referred to as counterpart components since both keys or field names occur in the requests but the assigned values can differ. If either of the requests has a component that does not have a counterpart, then that component is a variable component.

At block 406, the cache manager determines whether the selected counterpart components have a varying assigned value or a common value. If the counterpart components have different assigned values, then operational flow proceeds to block 409. Otherwise, operational flow proceeds to block 407.

At block 407, the cache manager updates a statistic for the common component. For instance, the cache manager maintains a count of each component that is common. The cache manager maintains statistics for each common and each variable component across comparisons. The ratio of common to total components can be used to inform cache management decisions or cache bypass decisions. Operational flow proceeds to block 411.

At block 409, the cache manager records an indication of the variable component. As an example, the cache manager may determine that the USER AGENT field in the header of the pair of requests has a different value. The cache manager records the field name and, optionally, the value assigned to the field. After processing has completed, the recorded indications of variable components will be the cache key template or used to create a cache key template. The cache manager updates a statistic for the variable component, similar to the common component statistic. Operational flow proceeds to block 411.

At block 411, the cache manager determines whether there is an additional component to process for at least one of the API requests. If there is an additional component, then operational flow returns to block 405. Otherwise, operational flow proceeds to block 413.

At block 413, the cache manager determines whether there is an additional pairing of API requests to process in the secondary grouping. If there is an additional pairing of API requests to compare, then operational flow returns to block 401. Otherwise, operational flow ends.

FIG. 5 is a flowchart of example operations for determining opportunities for accelerating APIs based on correlations between requests and responses. The example operations correspond to what was previously referred to as partial matching analysis. If an API, as represented by an API fingerprint, does not have at least a pairing of API requests that map to the same response content or response content hash (i.e., each API request of the API maps to different response content) then the transactions of the API will be analyzed for partial match-based acceleration.

At block 501, the cache manager groups transactions of non-accelerated APIs with sufficient partial matching of response content. The cache manager evaluates each first grouping that does not correspond to an accelerated API to determine whether the response content of the transactions of the API fingerprint match to a sufficient threshold. Instead of mapping to hash values of the response content, the cache manager evaluates the components of the response content (e.g., the key-value pairs of the response body). Sufficiency is represented by a defined threshold, such as 80% of response components in the response body match across the responses of the grouping. The threshold is defined to facilitate reliable construction of dynamic response content.

At block 503, the cache manager begins processing each grouping of transactions with sufficient partial matching. Depending upon how the transactions are represented, the cache manager may iterate through a file that includes requests and responses.

At block 505, the cache manager identifies variable response components across the partial matching grouping of transactions. The cache manager processes the responses of the grouped transactions, similar to the processing of the requests, to identify each key/field in the response body that does not have the same value assigned. Thus, a response component is variable even if only 1 response has a different value assigned to a key than the other responses in the partial matching grouping. The cache manager maintains statistics for each variable response component. For example, the cache manager maintains a count of detections or occurrences of a variable response component across a grouping. Embodiments can identify these variable response components when identifying variable request components to reduce traversals of the object or file with the transactions.

At block 507, the cache manager determines whether the variable response components are consistent. For reliable construction of a response with dynamic content, the cache manager constrains itself to ensuring that a candidate for partial matching based acceleration has consistency across the variable response components. If a variable response component is absent from a response in the partial matching grouping, then the corresponding API will not be accelerated. For example, a variable response component is determined as not consistent if the count of a variable response component is not the same as the count of responses. If the cache manager determines that variable components are not consistent, then operational flow proceeds to block 517. If the variable response components consistently occur across the responses of the partial matching grouping, then operational flow proceeds to block 509.

At block 509, the cache manager begins processing each transaction in the partial matching grouping. For instance, the cache manager iterates over entries in a log or archive file.

At block 511, the cache manager determines whether each variable response component correlates to a request component. For each variable component of each response in the partial matching grouping, the cache manager will analyze the corresponding API request to determine whether the variable response component correlates to a request component. Components correlate if they match. For example, the cache manager will search an API request for a key-value pair that matches a variable key-value pair in the corresponding response. Confirming correlation confirms that a response is generated with components from the API request. If each variable response correlates to an API request component, then operational flow proceeds to block 513. If not, then operational flow proceeds to block 515.

At block 513, the cache manager records indication(s) of correlation into a response constructor. After determining that all of the variations of response content can be consistently mapped or correlated to API request components, then the cache manager creates a "response constructor." The response constructor is a data structure into which the cache manager stores the keys or field names that have been correlated to the variable response component and should be used to construct a response. Operational flow proceeds to block 515.

At block 515, the cache manager determines whether there is another transaction in the partial matching grouping to process. If so, operational flow returns to block 509. If not, then operational flow proceeds to block 517.

At block 517, the cache manager determines variable request components across partial match grouping, maintains acceleration candidacy statistics, and generates a cache key template. These operations are similar to those represented by block 313, but for requests in a partial matching grouping of transactions.

At block 519, the cache manager determines whether there is another partial matching grouping of transactions to process. If so, operational flow returns to block 503. If not, then operational flow ends for FIG. 5.

Figure 6:
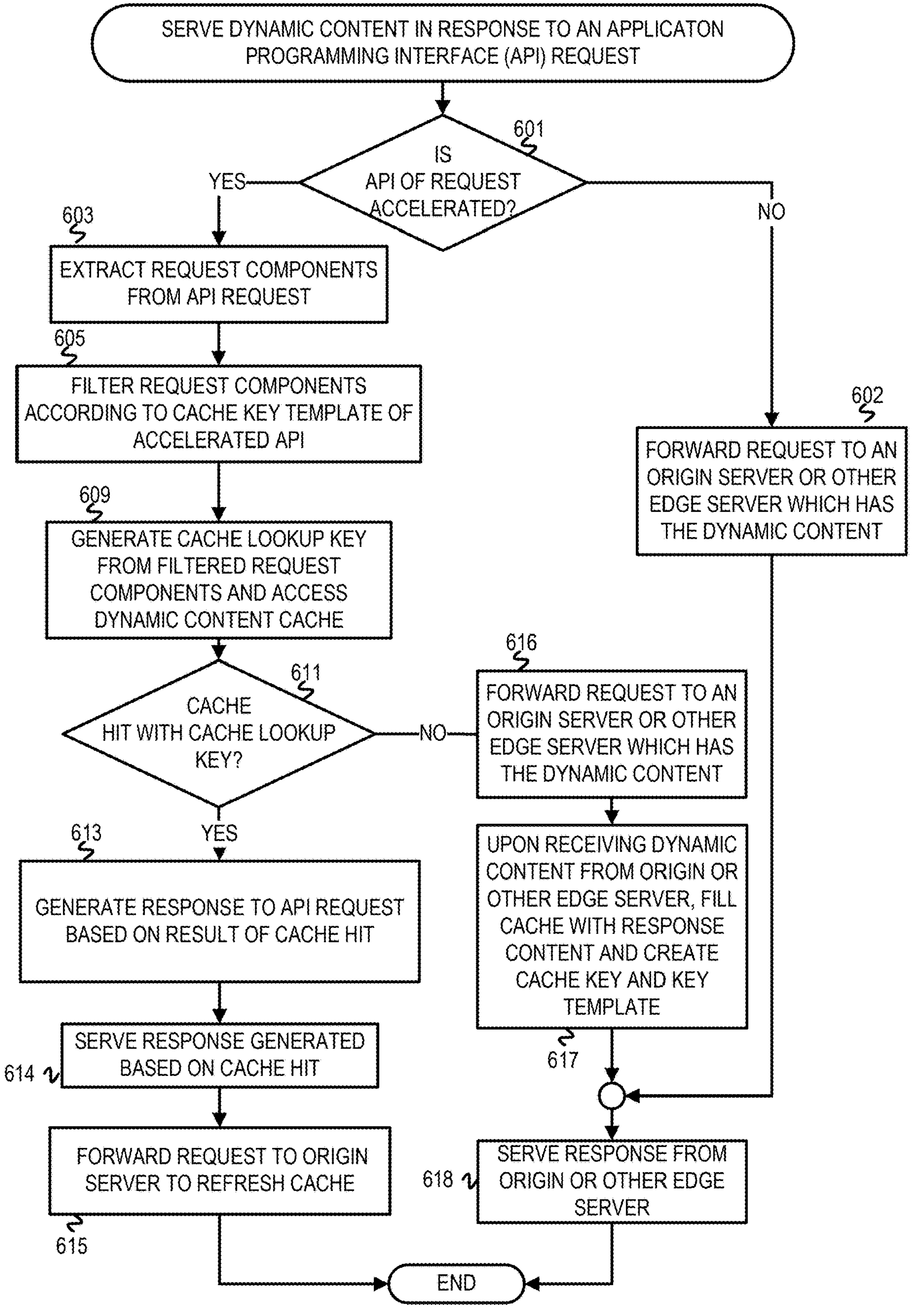
FIG. 6 is a flowchart of example operations for serving dynamic content to a client in response to an API request from the client.

FIG. 6 is a flowchart of example operations for serving dynamic content to a client in response to an API request from the client. Although an edge server will respond to requests with static and dynamic content cached at the edge server, these example operations are directed to determining whether dynamic content can be served in response to an API request as the mechanism for serving static content is not impacted.

At block 601, the cache manager determines whether an API of the API request has been accelerated. The cache manager extracts an API fingerprint from the API request by extracting the request method, domain and path from the request line of the API request. The cache manager then searches a store or local memory that associates API fingerprints to cache key templates (e.g., maps or indexes templates with API fingerprints). If the API fingerprint extracted from the API request is not found, then the API has not been accelerated and operational flow proceeds to block 602. If a cache key template is retrieved with the API fingerprint, then the API has been accelerated and operational flow proceeds to block 603.

At block 602, the cache manager forwards the request to an origin server. Since the API has not been accelerated and the cache is bypassed, the content is retrieved from an origin server. In some cases, the request can also be forwarded to another edge server that may have the content and respond more quickly than the origin server. Operational flow proceeds from block 602 to block 618.

At block 603, the cache manager extracts request components from the API request. The cache manager can parse the request and create a data structure (e.g., dictionary, list, array, etc.) of the components in the request line, request header, and request body. Implementations do not necessarily include in this data structure the request method and domain and path components in the URL in the request line of the API request since the API fingerprint would be included by default in the cache lookup key to be generated.

At block 605, the cache manager filters the request components extracted from the API request according to the cache key template of the accelerated API. As previously described, the cache key template will indicate the variable response components. The cache manager examines the extracted components to determine whether any of the variable components occur. Those that occur in the extracted request components are removed or filtered out to yield filtered request components.

At block 609, the cache manager generates a cache lookup key from the filtered request components. For instance, the cache manager computes a hash value with the filtered request components to generate the cache lookup key. In some implementations, the cache manager concatenates the request components to form a string that will be used as a cache lookup key, depending upon the implementation of the dynamic content cache. The cache manager then searches or accesses the dynamic content cache with the generated cache lookup key.

At block 611, the cache manager determines whether the cache lookup key hits in the dynamic content cache. If it hits and a result is returned, then operational flow proceeds to block 613. If the cache lookup key misses in the dynamic content cache, then operational flow proceeds to block 616 since no content can be served from the dynamic content cache for the API request.

At block 613, the cache manager generates a response to the API request based on a result of the cache hit. If the API was accelerated based on full matching, then the result will be the response content to be served and the edge server will create a response by retrieving from the cache the entries for the accelerated API for both the header and body of the response. By combining the entries (or the data within the files the entries may point to), the cache manager creates the response (i.e., the requested dynamic content). If the API was accelerated based on partial matching, then the result (i.e., the combined header and body of the response retrieved from the cache) will indicate a part of response content and correlation(s) to be used for completing the response. The cache manager will use the correlation(s) to locate and use the correlated request component(s) and construct the response. Embodiments do not necessarily cache the response header. An embodiment may retrieve a header from an origin server and create a response from the header retrieved from an origin server and the cached response body.

At block 614, the cache manager serves the response generated based on the cache hit. The cache manager will provide the generated response to the HTTP network process that will communicate the response to the appropriate client as indicated in the corresponding request.

At block 615, the cache manager forwards the request to an origin server to refresh the cache. Forwarding the request to an origin server after responding to the client allows for the accelerated response time while also maintaining recency of the content.

If the API of the API request had not been accelerated and the dynamic content cache bypassed (determined at block 601), then operational flow proceeds to block 602. At block 602, the cache manager forwards the API request to an origin server or other edge server which has the dynamic content. Operational flow proceeds to block 618 from block 602

If there was a cache miss at block 611, then the cache manager forwards the API request to an origin server or other edge server which has the dynamic content at block 616. Since the corresponding API is accelerated, the cache manager fills the cache with the response that is received from the origin server or other edge server at block 617. The cache lookup key will be used as the cache key for the new cached response body and response header entries. The miss may be due to the cache key being a first instance at the edge server. The miss may be for a different key. To illustrate, assume creation of a lookup key from a key template did not remove a query parameter user. The first miss in the cache was for a key that had a value 123 for the user query parameter component. The dynamic content cache was filled with the response content that was returned from an origin server. The next miss was for a lookup key for the same API but with a "user=456" query parameter. The second miss will lead to another cache key being created based on the cache lookup key that missed.

At block 618, the cache manager serves a response from the origin or other edge server to the client. If there was a miss in the dynamic content cache, then the response is served after the dynamic content cache is filled. If the API is not accelerated and the cache was bypassed (block 602), then the response from the origin server is communicated without an update to the dynamic content cache.

Variations

The example illustrations described the cache key templates as including indicators of variable request components and use of the acceleration candidacy statistics for determination of full matching analysis or sufficiency for partial matching analysis. Embodiments can also use the statistics to make cache bypass determinations. For example, the statistics can be associated with the API fingerprint or indicated in the cache key template. When attempting to respond to an API request, the cache manager can evaluate the statistics to determine whether to bypass the cache for responding to the request. The dynamic content cache may still include an entry for an API (i.e., the entry has not yet been evicted) but a most recent analysis resulting in acceleration candidacy statistics that no longer satisfy the criterion for full matching based acceleration. Similarly, a most recent analysis may have resulted in acceleration candidacy statistics that do not satisfy the sufficiency criterion for acceleration.

The flowcharts are provided to aid in understanding the illustrations and are not to be used to limit the scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example but not limited to, a system, apparatus, or device, which employs one or a combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 7:
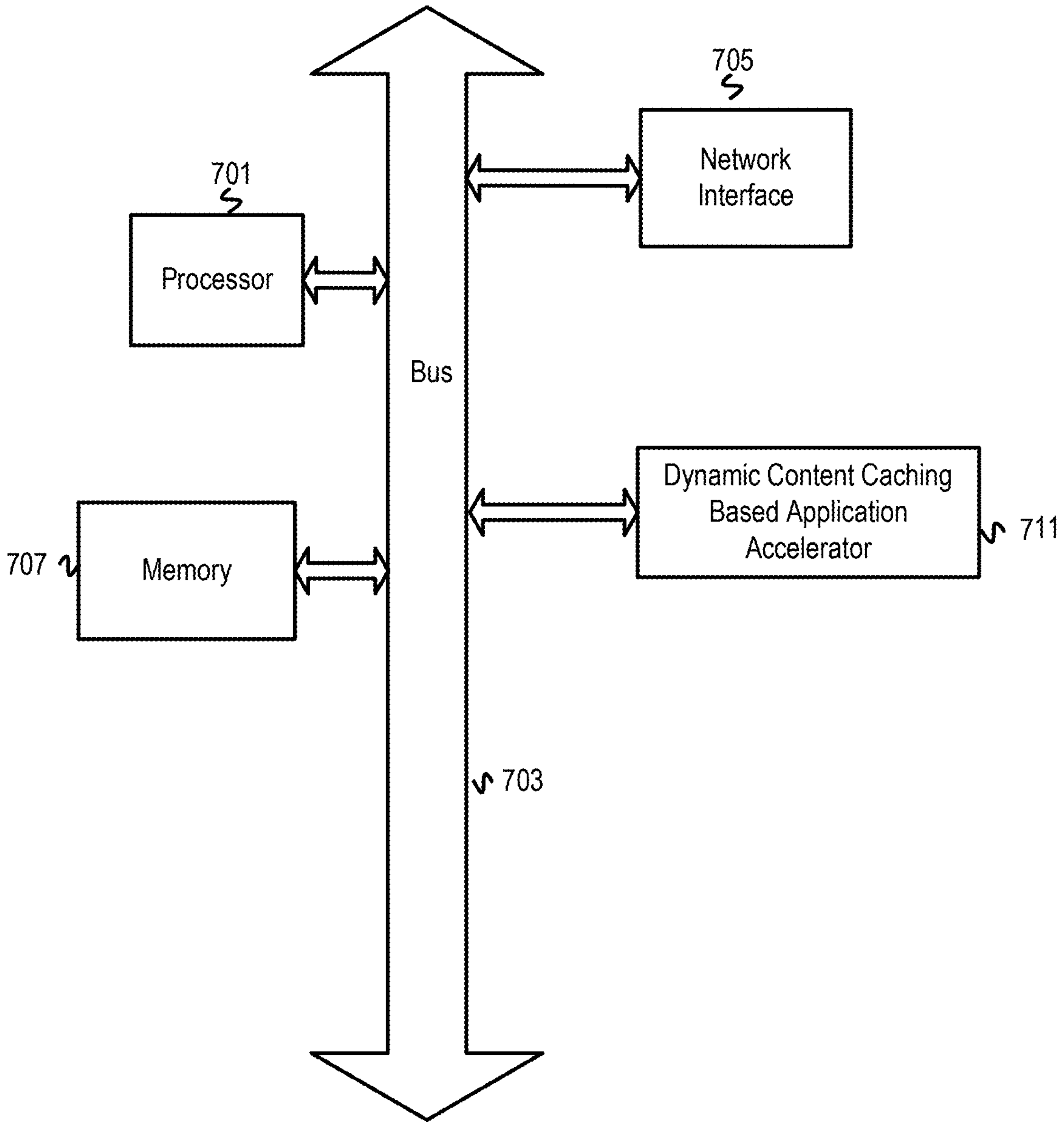
FIG. 7 depicts an example computer system with a dynamic content cache-based application accelerator.

FIG. 7 depicts an example computer system with a dynamic content cache based application accelerator. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes a dynamic content caching based application accelerator 711 ("application accelerator"). The application accelerator 711 periodically evaluates HTTP transactions to identify APIs represented in the transactions that can be accelerated by caching dynamic content. The application accelerator 711 can accelerate based on full matching or partial matching. The application accelerator 711 organizes the API transactions by API fingerprint and then common API response content. When multiple API requests have common API response content, the application accelerator 711 analyzes the API requests to identify request components (fields or keys in the API request) that vary across the API requests that map to a common API response content. The analysis yields statistics for tracking occurrence of both common and variable components across the requests. The statistics are used to determine trends across evaluations of HTTP transactions and inform acceleration decisions. The application accelerator 711 also records indicators of the variable components to create a key template for the API. The key template is used on a URL in an API request line for an API corresponding to the key template to create either a cache key or a cache lookup key. For APIs that cannot be accelerated based on full matching analysis, the application accelerator 711 analyzes the API transactions of a non-accelerated API to determine whether response content across requests match to a minimum threshold. If so, the application accelerator 711 proceeds to analyze the responses and corresponding API requests to determine whether components between the responses and requests can be consistently correlated and used to construct a response along with the matching portion of the response content. The correlations are recorded and used when constructing a response. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

The invention claimed is:

1. A method comprising:

creating dynamic content cache keys for web application acceleration, wherein creating a first of the dynamic content cache keys comprises, deriving a first application programming interface (API) fingerprint from requests indicated in first structured data of a plurality of hypertext transfer protocol (HTTP) transactions, wherein deriving the first API fingerprint comprises, grouping the requests by matching a first feature comprising a request method, uniform resource locator (URL) domain and path components;

for each group of requests with the matching first feature, grouping the requests by matching a second feature comprising response content;

for a first group of requests with matching first and second features, determining each component of the requests in the first group that varies among the requests in the first group; and generating the first API fingerprint based, at least in part, on the first feature of the first group and indication of a set of one or more request components determined as varying; and removing the set of varying request components from a first of the requests in the first group to create the first dynamic content cache key; and installing a first entry in a content cache with the first dynamic content cache key and the matching second feature of the first group.

2. The method of claim 1 further comprising obtaining second structured data of a plurality of HTTP transactions and filtering the second structured data to obtain the first structured data, wherein the filtering comprises filtering out HTTP transactions that do not have valid response content or that do not have successful response status codes.

3. The method of claim 2, wherein the filtering further comprises filtering out HTTP transactions that correspond to at least one of proxy-cacheable static content and browser cacheable content.

4. The method of claim 2, wherein the filtering further comprises filtering out HTTP transactions that do not satisfy a response time threshold.

5. The method of claim 1 further comprising detecting an incoming HTTP request and determining that the first feature of the incoming HTTP request matches the first feature indicated in the first API fingerprint and determining whether the incoming HTTP request maps to the first entry, wherein determining whether the incoming HTTP request maps to the first entry comprises removing the set of varying request components indicated in the API fingerprint from the URL of the incoming HTTP request and from at least one of a header and body of the incoming HTTP request to generate a key, and accessing the content cache with the key, and responding to the incoming HTTP request with the dynamic content cached at the first entry.

6. The method of claim 5 further comprising retrieving content from an origin server corresponding to the first feature after responding with the dynamic content.

7. The method of claim 1, wherein determining each component of the requests that varies among the requests in the first group comprises pairwise comparison of components of the requests in the first group.

8. The method of claim 6, wherein pairwise comparison of components of the requests in the first group comprises recursively traversing a hierarchical structure of each entry in the first structured data that corresponds to the requests of each pairwise comparison.

9. The method of claim 1, wherein the first structured data is data in a HTTP archive format file.

10. A non-transitory, machine-readable medium having program code stored thereon, the program code comprising instructions to:

create cache keys for dynamic content of a set of one or more application programming interfaces (APIs) indicated in a first structured data of hypertext transfer protocol (HTTP) transactions, wherein the instructions to create the cache keys comprise instructions to, correlate requests of the HTTP transactions by matching request method and uniform resource locator (URL) domain and path components;

for each set of requests correlated by the matching request method and URL domain and path components, correlate the requests in the set that map to matching response content;

for each set of requests correlated by request method and URL domain and path components and by matching response content, determine each component of the requests in the set that varies among the requests in the set; and record into a structure as a fingerprint for a corresponding one of the set of APIs the matching request method and URL domain and path components of the set and indication of a set of one or more request components determined as varying, wherein the corresponding one of the set of APIs corresponds to the matching request method and URL domain and path components; and create the cache key for the corresponding one of the set of APIs and the matched response content with URL and body components of the requests in the set not indicated as varying; and install the cache keys and corresponding matched response content in the content cache.

11. The non-transitory, machine-readable medium of claim 10, wherein the program code further comprises instructions to obtain second structured data of a plurality of HTTP transactions and filter the second structured data to obtain the first structured data, wherein the instructions to filter comprise instructions to filter out HTTP transactions that do not have valid response content or that do not have successful response status codes.

12. The non-transitory, machine-readable medium of claim 11, wherein the instructions to filter further comprise at least one of instructions to filter out HTTP transactions that correspond to at least one of proxy-cacheable static content and browser cacheable content and instructions to filter out HTTP transactions that do not satisfy a response time threshold.

13. The non-transitory, machine-readable medium of claim 10, wherein the program code further comprises instructions to:

determine whether response content cached in the content cache can be served in response to an incoming HTTP request, wherein the instructions to determine whether cached response content can be served in response to the incoming HTTP request comprise instructions to, determine whether an API fingerprint structure indicates matching request method and URL domain and path components of the incoming HTTP request;

based on a determination that an API fingerprint structure indicates matching request method and URL domain and path components of the incoming HTTP request, generate a lookup key that is the URL of the incoming request and at least one of a header and a body of the incoming HTTP request excluding the set of one or more varying request component indicated in the API fingerprint and access the content cache with the lookup key; and in response to the incoming HTTP request, serve content returned from accessing the content cache with the lookup key.

14. The non-transitory, machine-readable medium of claim 13, wherein the program code further comprises instructions to retrieve content from an origin server corresponding to the matching request method and URL domain and path components after serving the content.

15. The non-transitory, machine-readable medium of claim 10, wherein the instructions to determine each component of the requests that varies among the requests in the set comprise instructions to pairwise compare components of the requests within each set.

16. The non-transitory, machine-readable medium of claim 15, wherein the instructions to pairwise compare components of the requests within each set comprise instructions to recursively traverse a hierarchical structure of each entry in the first structured data that corresponds to the requests of each pairwise comparison.

17. The non-transitory, machine-readable medium of claim 10, wherein the first structured data is data in a HTTP archive format file.

18. An apparatus comprising:

a processor; and a machine-readable medium having stored thereon instructions executable by the processor to cause the apparatus to, create cache keys for dynamic content of a set of one or more application programming interfaces (APIs) indicated in a first structured data of hypertext transfer protocol (HTTP) transactions, wherein the instructions to create the cache keys comprise instructions to, correlate requests of the HTTP transactions by matching request method and uniform resource locator (URL) domain and path components;

for each set of requests correlated by the matching request method and URL domain and path components, correlate the requests in the set that map to matching response content;

for each set of requests correlated by request method and URL domain and path components and by matching response content, determine each component of the requests in the set that varies among the requests in the set; and record into a structure as a fingerprint for a corresponding one of the set of APIs the matching request method and URL domain and path components of the set and indication of a set of one or more request components determined as varying, wherein the corresponding one of the set of APIs corresponds to the matching request method and URL domain and path components; and create the cache key for the corresponding one of the set of APIs and the matched response content with the API fingerprint and header and body components of the requests in the set not indicated as varying; and install the cache keys and corresponding matched response content in the content cache.

19. The apparatus of claim 18, wherein the machine-readable medium further has stored thereon instructions executable by the processor to cause the apparatus to obtain second structured data of a plurality of HTTP transactions and filter the second structured data to obtain the first structured data, wherein the instructions to filter comprise instructions to filter out HTTP transactions that do not have valid response content or that do not have successful response status codes.

20. The apparatus of claim 19, wherein the instructions to filter further comprise at least one of instructions executable by the processor to cause the apparatus to filter out HTTP transactions that correspond to at least one of proxy-cacheable static content and browser cacheable content and instructions executable by the processor to cause the apparatus to filter out HTTP transactions that do not satisfy a response time threshold.

21. The apparatus of claim 18, wherein the machine-readable medium further has stored thereon instructions executable by the processor to cause the apparatus to:

determine whether response content cached in the content cache can be served in response to an incoming HTTP request, wherein the instructions to determine whether cached response content can be served in response to the incoming HTTP request comprise instructions to, determine whether an API fingerprint structure indicates matching request method and URL domain and path components of the incoming HTTP request;

based on a determination that an API fingerprint structure indicates matching request method and URL domain and path components of the incoming HTTP request, generate a lookup key that is the URL of the incoming request and at least one of a header and a body of the incoming HTTP request excluding the set of one or more varying request component indicated in the API fingerprint and access the content cache with the lookup key; and in response to the incoming HTTP request, serve content returned from accessing the content cache with the lookup.

* * * * *